Patented Sept. 6, 1938

2,128,901

UNITED STATES PATENT OFFICE 2,128,901

ARALKYL ETHER ESTERS

Shailer L. Bass and Edward M. Van Duzee, Midland, Mich., assignors to The Dow Chemical Company, Midland, Mich., a corporation of Michigan No Drawing. Application August 21, 1936, Serial No. 97,188

8 Claims. (Cl. 260—474)

The present invention concerns a new class of compounds, namely, the aralykyl ethers of the hydroxy-substituted benzoic acid esters and such derivatives thereof as contain aryl, alkyl, or halogen substituents in the hydroxylated benzene ring.

We have prepared compounds of the aforementioned class, determined certain physical properties thereof, whereby they may be readily identified, and found that they are particularly useful as intermediates for the manufacture of pharmaceuticals, and as plasticizing agents for cellulose derivatives, such as ethyl cellulose. The invention, then, lies in the new products hereinafter fully described and particularly pointed out in the claims.

The preparation of our new compounds can be accomplished by treating the alkali metal salt of a hydroxy-substituted benzoic acid ester compound directly with an aralykyl halide.

For example, a hydroxy-substituted benzoic acid ester compound is added to a solution produced by digesting metallic sodium in alcohol, thereby producing an alcoholic solution of the sodium salt of said hydroxy-benzoate. An aralkyl halide is then introduced slowly into said sodium oxy-benzoate solution maintained at its refluxing temperature, to form the desired ether product. The reaction mixture is then cooled and diluted with several volumes of water to precipitate therefrom a crude ether product, which may thereafter be separated in any convenient manner, e. g. by extraction with an organic solvent, decantation, etc. The crude product so obtained is washed with water and purified, as by distillation or fractional crystallization, to obtain the desired ether in substantially pure form.

Our new compounds may also be obtained by (1) reacting a hydroxy-substituted benzoic acid ester compound with an aralkyl halide in the presence of an aqueous or aqueous-alcoholic solution of sodium hydroxide, or other suitable alkali, (2) by esterifying an aralkyl ether of a hydroxy-benzoic acid with an aliphatic alcohol, hydroxy-aryl compound, etc., (3) by reacting upon a suitable di-metallic salt of a hydroxy-benzoic acid with an aralkyl halide, or a mixture comprising an aralkyl halide, and an alkyl halide, or (4) by reacting upon the alkali metal salt of an aralkyl ether of hydroxy-benzoic acid with a suitable alkyl or aryl halide.

The following examples describe in detail the preparation of certain specific members of our new class of compounds but are offered only to illustrate the invention and are not to be construed as limiting the same.

Example 1

23 grams (1 mol.) of metallic sodium was digested with 500 milliliters of absolute alcohol and then 151.5 grams (1 mol.) of benzyl 4-hydroxy-benzoate, i. e. the benzyl ester of 4-hydroxy-benzoic acid, was reacted with the resulting alcoholate solution to form an alcoholic solution of the sodium salt of said hydroxy-substituted benzoic acid ester. This solution was warmed to its refluxing temperature and 126.5 grams (1 mol.) of benzyl chloride added thereto over a period of 1 hour. Refluxing was continued thereafter for 1 hour under atmospheric pressure, after which the reaction mixture was cooled and diluted with approximately 3 volumes of water. A dark oil separated out of the aqueous alcoholic suspension and was extracted therefrom with benzene, washed with water to remove suspended sodium chloride, filtered and the benzene removed by distillation at atmospheric pressure. The dark viscous residue obtained thereby was fractionally distilled under reduced pressure, whereby there was obtained 79 grams (0.248 mol.) of the benzyl ether of benzyl 4-hydroxy-benzoate as a white crystalline solid boiling between 191° and 193° C. at 3 millimeters pressure and freezing at approximately 31.7° C.

Example 2

17.3 grams (0.75 mol.) of metallic sodium was dissolved in 400 milliliters of alcohol and 124.5 grams (0.75 mol.) of ethyl salicylate reacted therewith to form the corresponding sodium salt of the salicylate. 121 grams (0.75 mol.) of 4-chloro-benzyl chloride was reacted therewith as described in Example 1, the product being 126 grams (0.43 mol.) of the 4-chloro-benzyl ether of ethyl salicylate, which is a water-white liquid boiling at 190°–193° C. at 2 millimeters pressure and having the specific gravity 1.221 at 20°/4° C.

Example 3

138.5 grams (0.75 mol.) of beta-phenylethyl bromide, 124.5 grams (0.75 mol.) of ethyl salicylate, and 17.3 grams of metallic sodium were reacted together in alcohol substantially as described in Example 1. 34.5 grams (0.127 mol.) of the beta-phenylethyl-ether of ethyl salicylate was isolated from the reaction product as a water-white, viscous oil boiling between 178° and 183° C. at 2 millimeters pressure and having the specific gravity 1.112 at 20°/4° C.

Example 4

4.2 grams (0.181 mol.) of metallic sodium, 43.9 grams (0.181 mol.) of the ethyl ester of 3-phenyl-salicylic acid, and 22.9 grams (0.181 mol.) of benzyl chloride were reacted together in 250 cubic centimeters of ethyl alcohol substantially as described in Example 1. The major product from the reaction consisted in 35.5 grams (0.101 mol.) of the benzyl ether of the ethyl ester of 3-phenyl-salicylic acid as a viscous liquid boiling between 200° and 210° C. at 2.5 millimeters pressure and having the specific gravity 1.142 at 20°/4° C.

Example 5

In a similar manner 7.1 grams (0.308 mol.) of metallic sodium, 100 grams (0.308 mol.) of the 4-chloro-2-phenyl-phenyl ester of salicylic acid, and 39 grams (0.308 mol.) of benzyl chloride were reacted together in alcoholic solution. This reaction resulted in the formation of 44.5 grams (0.108 mol.) of the benzyl ether of the 4-chloro-2-phenyl-phenyl ester of salicylic acid as a water-white, viscous liquid boiling at 176°–182° C. at 3 millimeters pressure and having the specific gravity 1.208 at 20°/4° C.

Example 6

460 grams (20 mols) of metallic sodium was digested with 12 liters of 95 per cent ethyl alcohol, and 3322 grams (20 mols) of ethyl salicylate added thereto to form an alcoholic solution of the sodium salt of ethyl salicylate. 2530 grams (20 mols) of benzyl chloride was reacted with the above solution, whereby there was obtained 3790 grams (14.8 mols) of the benzyl ether of ethyl salicylate as a water-white liquid boiling at 183°–187° C. at 3 to 4 millimeters pressure and having the specific gravity 1.137 at 20°/4° C.

Exampe 7

40 molar quantities each of metallic sodium, phenyl salicylate, and benzyl chloride were reacted together in 24 liters of alcohol, substantially as described in Example 1. Fractional distillation of the crude reaction product resulted in the isolation of 3031 grams (9.96 mols) of the benzyl ether of phenyl salicylate as a viscous, yellow-tinged liquid boiling at 174°–179° C. at 3 millimeters pressure and having the specific gravity 1.135 at 20°/4° C.

In a simiar manner other aralkyl ethers of hydroxy-benzoic ester compounds were prepared. The following table lists the physical characteristics of various representative members of this class:

Among other aralkyl ethers of the hydroxy-substituted benzoic acid esters which may be prepared according to the above-described procedures are compounds of salicylic acid in which the salicylic acid molecule contains hydrocarbon and halogen substituents and in which the etherifying and esterifying groups differ from those shown in the examples. For example, by substituting other aralkyl halides and salicylic ester compounds for those previously shown, compounds are prepared, such as benzyl ether of the ethyl ester of 3-methyl salicylic acid i. e. benzyl ether of ethyl ortho-cresotinate, 2,4-dichlorobenzyl ether of cyclohexyl salicylate, 2-bromo-phenylethyl ether of benzyl salicylate, and phenyl-amyl ether of the propyl ester of 5-chloro-salicylic acid. Other 4-hydroxy-benzoic acid derivatives prepared according to the described procedure are phenyl-octyl ether of the ethyl ester of 3.5-dichloro-4-hydroxy-benzoic acid, 4-bromo-benzyl ether of the phenyl ester of 4-hydroxy-benzoic acid, phenyl-hexyl ether of the normal butyl ester of 3-bromo-4-hydroxy-benzoic acid and phenyl-propyl ether of the alpha-naphthyl ester of 3-methyl-4-hydroxy-benzoic acid. By substituting 3-hydroxy-benzoic acid derivatives for the ortho- and para- isomers shown above, the corresponding aralkyl ethers of meta-hydroxy-benzoic acid esters are formed, such as benzyl ether of ethyl 3-hydroxy-benzoate, 3-chloro-benzyl ether of propyl 3-hydroxy-benzoate, and the phenyl-butyl ether of the 4-chloro-phenyl ester of 3-hydroxy-benzoic acid, etc. In place of the sodium salts employed in the above examples, other alcohol-soluble metallic hydroxy-benzoate derivatives may be employed, e. g. the potassium compounds, etc.

The compounds to which this invention particularly relates have the following formula

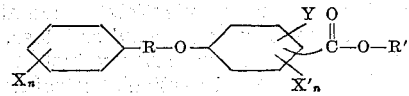

wherein X and X' each represent hydrogen or halogen, n is an integer not greater than 2, R is an alkylene group, R' is a hydrocarbon radical containing two or more carbon atoms from the group consisting of the alkyl, cyclo-alkyl, aralkyl, aryl, and halo-aryl radicals, and Y represents an alkyl or aryl radical or hydrogen.

Other modes of applying the principle of our invention may be employed instead of those explained, change being made as regards the materials employed, provided the products described in the following claims be thereby obtained.

We therefore particularly point out and distinctly claim as our invention:—

Table

| Benzyl ether of— | Boiling point | Freezing point | Melting point | Specific gravity at 20°/4° C. | Form |
|---|---|---|---|---|---|
| | | ° C. | ° C. | | |
| 4-phenyl-phenyl ester of salicylic acid | | | 130–2 | | White, crystalline solid. |
| 4-cyclohexyl-phenyl ester of salicylic acid | | | 85–6 | | Do. |
| 2-phenyl-4-bromo-phenyl ester of salicylic acid | 215–219° C. at 3 mm | 46 | | | Do. |
| 2-phenyl-6-chloro-phenyl ester of salicylic acid | 203–208° C. at 3 mm | 40.3 | | | Do. |
| 2-phenyl-phenyl ester of salicylic acid | 189–191° C. at 3 mm | | | 1.137 | Water-white liquid. |
| Isoamyl ester of salicylic acid | 170–174° C. at 1 mm | | | 1.130 | Do. |
| 2-methyl-5-isopropyl-phenyl ester of salicylic acid | 175–179° C. at 2 mm | | | 1.128 | Straw-colored liquid. |

1. An aralkyl ether of a hydroxy-substituted ethyl benzoate compound having the formula,

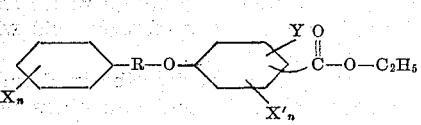

wherein X and X' each represent a substituent selected from the class consisting of hydrogen and halogen, each n is an integer not greater than 2, R is an alkylene group, and Y represents a substituent selected from the group consisting of the alkyl and aryl radicals and hydrogen.

2. An aralkyl ether of a hydroxy-substituted ethyl benzoate compound having the formula,

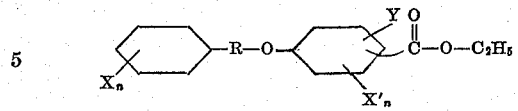

wherein X and X' each represent a substituent selected from the class consisting of hydrogen and halogen, each $n$ is an integer not greater than 2, R is an alkylene group containing from 1 to 8 carbon atoms, inclusive, and Y represents a substituent selected from the group consisting of the alkyl and aryl radicals and hydrogen.

3. A benzyl ether of a hydroxy-substituted ethyl benzoate compound having the formula,

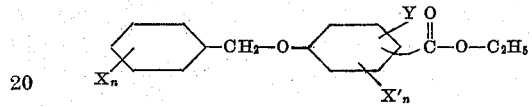

wherein X and X' each represent a substituent selected from the class consisting of hydrogen and halogen, each $n$ is an integer not greater than 2, and Y represents a substituent selected from the group consisting of the alkyl and aryl radicals and hydrogen.

4. A halo-benzyl ether of a hydroxy-substituted ethyl benzoate compound having the formula,

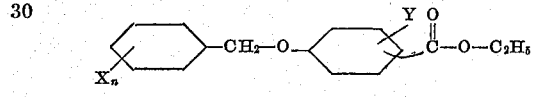

wherein X represents halogen, $n$ is an integer not greater than 2, and Y represents a substituent selected from the group consisting of the alkyl and aryl radicals and hydrogen.

5. A chloro-benzyl ether of a hydroxy-substituted ethyl benzoate compound having the formula,

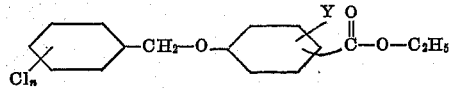

wherein $n$ is an integer not greater than 2, and Y represents a substituent selected from the group consisting of the alkyl and aryl radicals and hydrogen.

6. An aralkyl ether of an ethyl salicylate compound having the general formula,

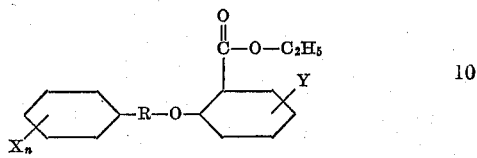

wherein X represents a substituent selected from the class consisting of hydrogen and halogen, R is an alkylene group, and Y represents a substituent selected from the group consisting of the alkyl and aryl radicals and hydrogen.

7. A benzyl ether of an ethyl salicylate compound having the formula,

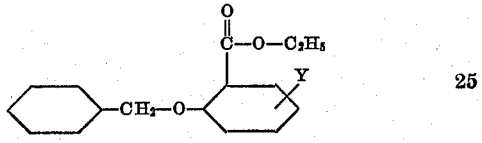

wherein Y represents a substituent selected from the group consisting of the alkyl and aryl radicals and hydrogen.

8. The benzyl ether of ethyl salicylate having the formula,

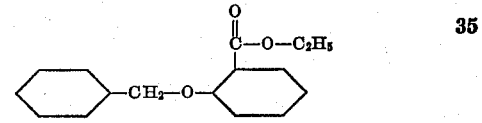

SHAILER L. BASS.
EDWARD M. VAN DUZEE.